(12) United States Patent
Fukushima et al.

(10) Patent No.: US 6,951,427 B2
(45) Date of Patent: Oct. 4, 2005

(54) PRINTER WITH CUTTING DEVICE

(75) Inventors: Itaru Fukushima, Tokyo (JP); Satoshi Yamanushi, Nirasaki (JP); Yuuki Horigome, Kofu (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 10/804,072

(22) Filed: Mar. 19, 2004

(65) Prior Publication Data

US 2004/0179884 A1 Sep. 16, 2004

Related U.S. Application Data

(62) Division of application No. 09/964,504, filed on Sep. 28, 2001.

(30) Foreign Application Priority Data

Oct. 4, 2000 (JP) ........................................ 2000-304704

(51) Int. Cl.⁷ ............................ B41J 11/26; B41J 11/27
(52) U.S. Cl. ...................... 400/621; 355/400; 271/3.14
(58) Field of Search ............................ 400/621; 355/40, 355/27, 41, 400, 406; 271/3.13, 3.14; 399/367–368, 370, 364, 333

(56) References Cited

U.S. PATENT DOCUMENTS

| | | | | |
|---|---|---|---|---|
| 5,229,827 A | * | 7/1993 | Sato et al. .................. | 399/385 |
| 5,307,092 A | * | 4/1994 | Larson ........................ | 347/124 |
| 5,316,883 A | * | 5/1994 | Eto et al. .................... | 430/138 |
| 5,596,389 A | * | 1/1997 | Dumas et al. ................ | 399/16 |
| 6,243,157 B1 | * | 6/2001 | Tsuzawa ...................... | 355/40 |
| 2002/0191992 A1 | * | 12/2002 | Funato ........................ | 399/320 |
| 2004/0041991 A1 | * | 3/2004 | Obertegger .................. | 355/29 |

* cited by examiner

Primary Examiner—Daniel J. Colilla
Assistant Examiner—Marissa Ferguson
(74) Attorney, Agent, or Firm—Manabu Kanesaka

(57) ABSTRACT

A printer includes an exposing section for exposing a recording medium, a first feed device for feeding the recording medium while contacting both side edges of the recording medium, a developing section for development of the recording medium, a recording media feed path arranged between the exposing section and the developing section, a second feed device arranged in the recording media feed path for feeding the recording medium to the developing section while contacting the both side edges of the recording medium, and a cutting device for cutting four edges of the recording medium, a third feed device arranged between the developing section and the cutting device for feeding the recording medium to the cutting device while contacting the both side edges of the recording medium. An apparatus housing retains the exposing section, the developing section, the cutting device, and the first, second, and third feed devices therein.

9 Claims, 5 Drawing Sheets

PRINTER WITH CUTTING DEVICE

CROSS REFERENCE TO RELATED APPLICATION

This is a divisional application of a patent application Ser. No. 09/964,504 filed on Sep. 28, 2001.

BACKGROUND OF THE INVENTION

1. Field of the Invention

The present invention relates to a printer with a device for cutting recording media, such as photosensitive recording paper and the like having an image and the like printed. More specifically, it relates to a printer with a cutting device for cutting recording media accurately and securely for continuously cutting a plurality of the recording media accurately and securely.

2. Description of the Prior Art

A prior printer makes exposure on a photosensitive recording sheet before pressing it to develop, thereby forming an image on a surface of the photosensitive recording sheet. As an example, Japanese Patent Application Publication 2000-147678(A) discloses a recording apparatus as a printer such that: a photosensitive recording sheet called the Cycolor media is used that is formed of lamination of microcapsules filled with either one of coloring materials of cyan, magenta, and yellow each; the photosensitive recording sheet has a light of desired wavelength irradiated to a surface thereof to expose a color image; in other words, the surface is made to react to a light of specific wavelength to cure a sensitive material filled in the microcapsule together with the coloring material; the curing makes coloring reaction of the coloring material inactive; after that, a high pressure is applied to the active microcapsule without reacting to the light of specific wavelength to destroy for development (coloring), thereby forming the color image.

The prior printer mentioned above has an advantage that a running cost for printing can be kept low as consumable materials such as toner and ink or ink ribbon are not needed except for the above-mentioned Cycolor medium only for forming, or printing, the color image. The above-mentioned Cycolor mediun is on the market in the form of a blank cut sheet, such as a rectangular form, before the printing processes (exposing and pressure-developing processes). In the cutting process to the blank form, the Cycolor medium has an undesired force applied to four edges thereof. The four edges result in destruction of the microcapsules of non-unactiviated (active) state having the coloring materials filled therein. It is disadvantageous that the four edges cannot be developed to desired colors, but become black or undesirable results.

To overcome the problem, Japanese Patent Application Publication Hei 10-62871(A) discloses a technique that prior to the above-mentioned cutting step, the four edges of the Cycolor medium are pre-exposed to white and, the microcapsules existing on the edges are made inactive as a white frame to prevent the white edges from becoming black even if after that, a pressure is applied to the edges at the cutting step for a standard form.

However, the above-mentioned processing made on the recording mediu, results in increased cost of the medium as consumable item, or unavoidably increased running cost in the printing process with use of the medium.

On the other hand, the printer having such a medium used is useful as a photo-printer. The photosensitive recording paper having a color image formed, like the photograph having usual negative film used, has been needed to have the image formed on the entire surface without four edges in finish.

Various prior art methods for cutting the recording media have been disclosed and put to practical use. Japanese Patent Application Publication Hei 11-202418(A), as an example, discloses a structure having a cutter unit made up of a horizontal cutter and a vertical cutter, the horizontal cutter being for cutting photosensitive material having a plurality of images printed (exposed) to specific lengths depending on lengths of individual prints formed on the photosensitive material and, the vertical cutter being for cutting the photosensitive material having the plurality of wide images printed to specific widths depending on widths of the individual prints, thereby horizontally and vertically cutting the photosensitive material for the plurality of prints. However, the structure unlike the present invention cannot be used to cut the four edges out of the recording medium, but also is not elaborated for accurate and secure cutting the photosensitive material in any way as to posture and holding state of the photosensitive material in cutting the photosensitive material.

An object of the present invention is to provide a printer with a dutting device for cutting recording medium capable of cutting four edges of the recording medium having an image or the like printed accurately and securely.

SUMMARY OF THE INVENTION

Briefly, the foregoing object is accomplished in accordance with aspects of the present invention by a cutting device for cutting four edges out of recording medium being fed, comprising in combination: a side cutter for cutting both side edges of the recording medium fed in a feed direction of the recording medium; an end cutter for cutting leading and trailing end edges out of the recording medium fed in a feed direction of the recording medium; and, a recording medium feed path having a curve or a plurality of curves formed on at least a part thereof; wherein the side cutter is arranged on the corner or corners of the recording medium feed path.

The foregoing and other objects, advantages, manner of operation and novel features of the present invention will be understood from the following detailed description when read in connection with the accompanying drawings.

DETAILED DESCRIPTION OF PREFERRED EMBODIMENTS

The following describes in detail an embodiment of the printer according to the present invention in reference to the drawings attached here.

The printer according to the present invention includes an ink jet printer, a laser printer, and similar printing apparatuses. This embodiment described is for a printer appropriate for Cycolor film (hereinafter referred to as the Cycolor printer), and the Cycolor film is a photosensitive recording sheet.

First, an overview of the Cycolor printer embodied according to the present invention is described below.

Figure 1:
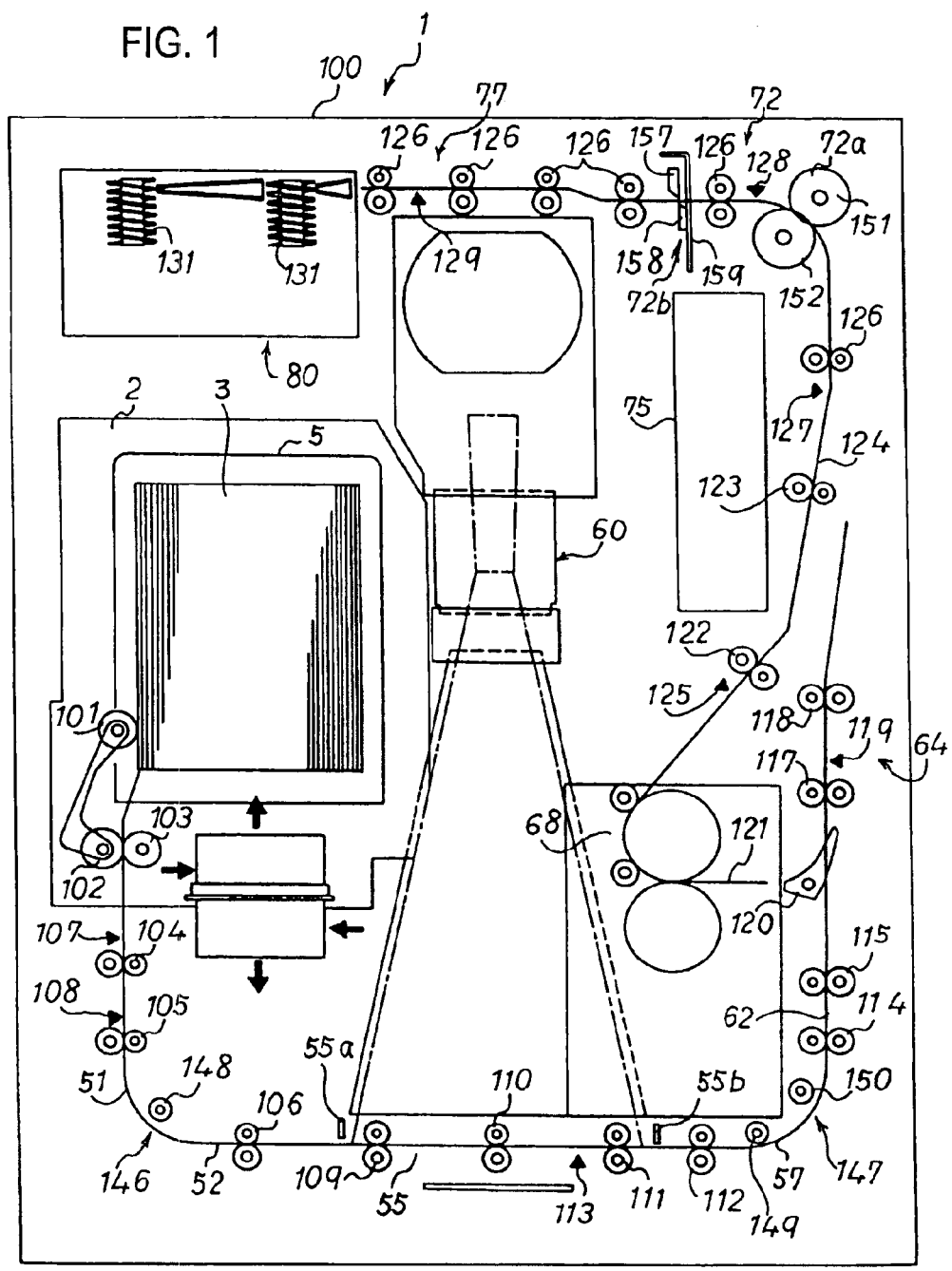
FIG. 1 is a front overview for an entire structure of the printer in an embodiment of the present invention.

FIG. 1 is a front view illustrating the Cycolor printer 1. A top and a bottom of the figure correspond to those of an apparatus housing 100, and right and left sides correspond to those of the apparatus housing 100.

A media container for a medium 3, including a recording media and film, is arranged in an upper area of the apparatus housing 100. A media unloading port for the medium 3 is arranged closed to the media container, on the top of the apparatus housing 100. A feed path is formed from the media container to the media unloading port. Along the feed path are disposed processing sections, including an exposing section, a developing section, and a fixing section. The feed path is disposed in a loop manner inside the apparatus housing 100 as wrapping the processing sections. Parts of the feed path are sharply curved, including a switchback section 64 and an alternative path 121 that will be described later. Such a construction allows every processing section to have space enough to make a single medium stay therein.

The media container has a cassette room 2 disposed on a side of the apparatus housing 100, on an upper left side in the figure. The cassette room 2 can load a media cassette 5 therein from a front side in the figure. The media cassette 5 is capable of containing a many number of media 3 for forming desired images. For loading the many number of media 3, they are put downward into the media cassette 5, vertically in the apparatus housing 100 (printer 1). In other words, the many number of media 3 can be loaded so that they can be linearly fed out of the media cassette 5 to the feed path without changing their direction.

Loading the media cassette 5 in the media container, or the cassette room 2, makes synchronization with a media picking arrangement (not shown) to run a pick roller 101. The pick roller 101 is pressed to the medium 3 in the media cassette 5. At the same time, a media pressing arrangement (not shown) operates to press the medium 3 in the media cassette 5 to the pick roller 101. As a result, the pick roller 101 can keep feeding the media 3 in the media cassette 5 one by one in sequence.

The cassette room 2 also has a media separating arrangement disposed therein for preventing more than one sheet of the media 3 fed by the pick roller 101 from being fed out to a feed path 51 (which will be described later) at the same time. The media separating arrangement is formed of a pick roller 101 and a separating roller 103 faced and pressed to each other. The feed roller 102 is controlled in rotation so as to feed out the medium 3 toward the feed path 51, while the separating roller 103 is controlled in rotation so as to draw back the medium 3 toward the pick roller 101. The feed roller 102 in the embodiment is controlled to have greater drive force (torque) than the separating roller 103. Such a media separating mechanism can separate the media 3 fed by the pick roller 101 one by one before feeding to the feed path 51.

The medium 3 is formed of a viscous layer having polyester film coated with a bonding layer and containing numbers of photosensitive microcapsules called Cyris and a transparent PET (polyester terephthalate) layer covering it.

Each of the microcapsules is filled with a photosensitive agent reactive to a different wavelength and either one of dyes of CYM (cyan, yellow, and magenta). The microcapsule containing the cyan dye is cured with a red light received, that of the yellow dye with a blue light, and that of the magenta with a green light. Microcapsules not reactive to lights of specific wavelengths and ones receiving no lights cannot be cured. Such microcapsules and a developing and fixing agent called the developer resin are bound to a special oily viscous agent to form the viscous layer.

Thus, when exposure is made by an exposing projector (which will be described later), red exposure portions have only the cyan dye cured, leaving the other dyes not cured. When a high pressure is applied by a developing roller arranged on the downstream end, the microcapsules containing the yellow dye and the magenta dye are disrupted, resulting in appearance of the red color. Similarly, green exposure portions have only the magenta dye cured, and the microcapsules containing the cyan dye and the yellow dye are destroyed, resulting in appearance of the green color. Blue exposure portions have only the yellow dye cured, and the microcapsules containing the cyan dye and the magenta dye are disrupted, resulting in appearance of the blue color.

The microcapsule is of a few microns of size. An LCD (liquid display panel) used for printing contains a few capsules per pixel. A curing degree of a microcapsule differs with an amount of exposure. This means that an image with color gradations can be formed with each microcapsule cured and disrupted depending on color data of each pixel.

A temperature controlling means (not shown) is disposed at the bottom of the cassette room 2 for controlling environment inside the media cassette 5. In the embodiment is used a Peltier device providing a Peltier effect that can produce temperature difference depending on a direction of a current flowing at a junction of dissimilar metals thereof. The Peltier device can be set for either of heating or cooling by controlling the polarity of the voltage applied to the junction. The effect can be utilized to optimize the temperature and humidity inside the media cassette 5.

Below the feed path 51 is arranged the feed path 51 for feeding the medium 3 fed out of the media cassette 5. The feed path 51 is directed down from the media cassette 5 toward a bottom of the apparatus housing 100 before being extended along the bottom of the apparatus housing 100 to an exposure path extended along the bottom.

The media cassette 51 has a plurality of feed rollers (two pairs of feed rollers 104 and 105 in this embodiment) arranged therealong. An error detecting sensor 107 is disposed upstream in front of the paired feed rollers 104, and a media detecting sensor 108 is disposed upstream in front of the paired feed rollers 105.

The error detecting sensor 107 is controlled to detect a state of the medium 3 and signal a feed error when a plurality of media 3 is not separated by the media separating arrangement mentioned above before being fed out at the same time. In the operation, feeding of the medium 3 is stopped in synchronous with the feed error indication.

The media detecting sensor 108 is controlled to detect a leading end edge of the medium 3 fed out of the feed path 51 via the paired feed rollers 104 before feeding out a leading end edge detection signal. In the operation, a media feeding arrangement (not shown) stops the pick roller 101 and the media separating arrangement, including the feed roller 102 and the separating roller 103, from rotating and allows only the paired feed rollers 104 and 105 according to the leading end edge detection signal. This can feed only a single sheet of the medium 3 to the feed path 51. The sheet or medium 3 then is transferred to the exposure path. With the transference to the exposure path, the following sheet or medium 3 is fed to the media cassette 5 at a predetermined instance before being stopped at a stand-by position (not shown) set in front of the exposure path. This assures the medium 3 can be transferred to the exposure path one by one.

The exposure path is formed of a pre-stage path 52 disposed in series to the feed path 51 for feeding downstream the medium 3 having passed through the feed path 51, an exposing stage 55 disposed downstream in series to the pre-stage path 52, and a post-stage path 57 disposed downstream in series to the exposing stage 55 for feeding the medium 3 having passed through the exposing stage 55.

The exposure path has a plurality of paired rollers therein for feeding downstream the medium 3 fed via the feed path 51. In the embodiment are disposed one pair of feed rollers 106 in the pre-stage path 52, three pairs of feed rollers 109, 110, and 111 in the exposing stage 55 at an equal interval, and one pair of feed rollers 112 in the post-stage path 57.

The exposing stage 55 has a media detecting sensor 113 disposed between the two pairs of feed rollers (between the paired rollers 110 and 111 in the embodiment). According to a sensor signal of the media detecting sensor 113, the medium 3 can be halted once at an exposure position on the exposing stage 55. In detail, the media detecting sensor 113 sends the sensor signal out if the medium 3 is put at the exposure position on the exposing stage 55 with the medium 3 fed on the exposing stage 55 via the pre-stage path 52. At that time, the paired rollers 109, 110, and 111 are controlled to stop from rotating in synchronous with the sensor signal.

In the state that the medium 3 is halted once, the medium 3 is exposed separately to three primary color lights, including R (red), G (green), and B (blue), on a printing side 3a thereof (FIG. 2) for a preprocess to form a desired image. It should be noticed that mylar light shields 55a and 55b are arranged on the upstream end and the downstream end of the exposing stage 55 respectively. The light shields 55a and 55b prevent the printing side 3a of the medium 3 from being irradiated by external noise lights (disturbing lights) while exposure is made on the exposing stage 55. In addition, a heater (not shown) is disposed on the bottom of the exposing stage 55 to keep the temperature of the exposing stage 55 to a specific value. The heater can minimize heat radiation of the exposing stage 55.

An exposing projector 60 as exposure light source is disposed at a position, above around a center of the apparatus housing 100, facing the exposing stage 55. The exposing projector 60 irradiates light to the printing surface 3a of the medium 3 for a specific exposure process.

The exposing projector 60 and the exposing stage 55 in the embodiment are integrated together as an exposing section for preprocessing to form the image on the printing surface 3a of the medium 3.

Figure 2:
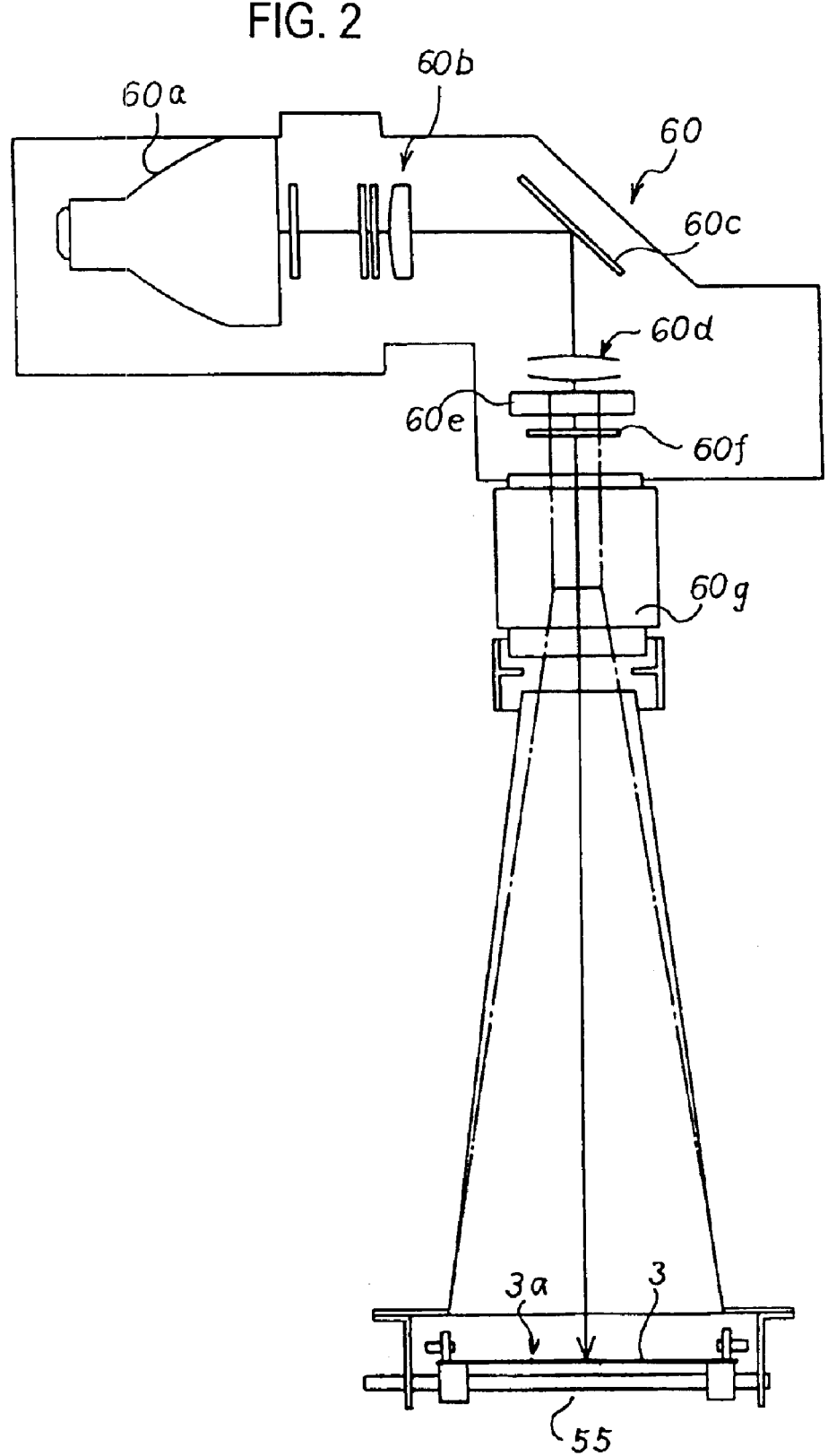
FIG. 2 is an overview for a structure of an exposing projector.

In the exposing projector 60, as shown in FIG. 2, the light radiated from the light source 60a (metal halide lamp) is aligned to a parallel beam through a second optical system 60b (an optical system including a fly array lens and a polarization converter device). The parallel beam then is deflected downward, or toward the exposing stage 55, by a mirror 60c before passing a second optical system 60d having a field lens, a three-color RGB filter driven to rotate, and a wave plate. If the three-color RGB filter is rotated, color image patterns are formed through an LCD panel 60e in timing with respective R, G, and B lights. The image formed on the LCD panel 60e then is projected onto the printing surface 3a of the medium 3 on the exposing stage 55 via a deflecting plate 60f and a projecting lens 60g.

The medium 3 having such an exposure process made is transferred to the post-stage path 57 via the paired feed rollers 112 before being controlled to stay on the post-stage path 57 for a specific sensitizing time. The sensitizing time is a period of time needed to develop colors on the exposed medium 3 through a developing process (which will be described later) and optimized depending on kind of medium 3, exposing time, and other factors. After the sensitizing time elapsed, the medium having stayed on the post-stage path 57 is transferred to a feed path 62 via paired feed rollers 114. It should be noticed that the post-stage path 57 is flexed upward (from the bottom to the top of the apparatus housing 100 and is connected with the feed path 62. The feed path 62 is extended upward inside the apparatus housing 100.

The feed path 62 formed vertically with respect to the apparatus housing 100 has paired cleaning rollers 115 and switchback section 64 disposed therearound in the order. The exposed medium 3 is cleaned by the paired cleaning rollers 115 before being fed to the switchback section 64. In synchronous with feeding of the medium 3, a next media 3 is fed and positioned on the exposing stage 55.

The exposed medium 3 is controlled to stay in the switchback section 64 for a dark time needed for coloring by the developing process (which will be described later). In detail, the switchback section 64 has two pairs of feed rollers 118 and 118 arranged therein along the feed path 62. The feed path 62 between the paired feed rollers 117 and 118 has a media detecting sensor 119 disposed thereon. If the exposed medium 3 being fed by the paired feed rollers 117 and 118 reaches a specific position, the media detecting sensor 119 outputs an sensor signal. The paired rollers 117 and 118 are synchronized with the sensor signal to stop. The exposed medium 3 is stayed at the specific position in the switchback section 64 for the sensitizing time. For the sensitizing time, the exposed medium 3 being successively fed is made to stay on the feed paths 57 and 62 between the exposing stage 55 and the switchback section 64.

The feed path 62 in the switchback section 64 is extended upward inside the apparatus housing 100 before being broken at around a vertical center of the apparatus housing 100. The medium 3 made to stay at the specific position in the switchback section 64 is returned on the same feed path 62 and guided through an alternative path 121 branched from an inlet of the switchback section 64 to a paired pressure developing rollers 68 that is a developing unit (which will be described later).

Now, the following describes structure, operation, and advantages of the switchback section 64.

The medium 3 exposed on the exposing stage 55 keeps its photosensitization state (exposure reaction) in the microcapsules thereof for a while even after the light irradiation stops. For the reason, the stabilizing time (dark time) for stabilizing the photosensitive reaction in the microcapsules is needed before the microcapsules are fractured by pressure of the paired pressure developing rollers 68. The stabilizing time can be obtained by making longer the feed path from the exposing stage 55 to the paired pressure developing rollers 68. However, an arrangement must be made large due to the long feed path accordingly.

The switchback section 64 therefore is provided to make the medium switchback to obtain the dark time needed without making the apparatus large. The paired feed rollers 117 and 118 in the switchback section 64 are arranged so that they can be controlled to drive independently of the other paired rollers, including the paired feed rollers 112 and 114, the paired cleaning rollers 115, and the paired pressure developing rollers 68, and the dark time for reaching the paired pressure developing rollers 68 can be changed to be longer or shorter freely by adjusting the staying time of the medium 3 in the switchback section 64.

In detail, with the paired feed rollers 117 and 118 rotated, say, normally, the medium 3 is taken onto the feed path 62 before being stopped at the specific position in the switchback section 64. When the dark time elapses, the paired feed rollers 117 and 118 are controlled to rotate in reverse direction if the paired pressure developing rollers 68 are synchronized with the paired feed rollers 117 and 118 in the switchback section 64, that is, if no preceding medium 3 exists between the paired pressure developing rollers 68 for development. As a result, the media 3 is fed in the reverse direction on the same In the embodiment, a switching gate 120 is disposed on the feed path 62 between the paired feed rollers 117 and the paired cleaning rollers 115. The switching gate 120 is actuated in synchronous with the reverse rotations of the paired feed rollers 117 and 118, the reverse rotations being given by the switchback driving arrangement. In that case, the medium 3 fed in the reverse direction on the feed path 62 is fed to the alternative path 121 via the switching gate 120 before being guided to the paired pressure developing rollers 68 with the printing surface 3a kept to direct up.

The paired pressure developing rollers 68, as shown in FIG. 1, are arranged to rotate as the rollers pressing each other at a specific pressure. The exposed medium 3 in which the microcapsules have been cured has a load applied to both surfaces thereof when passing the rollers 68 to destruct the microcapsules with hardness depending on an amount of exposure. With the microcapsules with a specific hardness destructed, die (ink) in the microcapsules exudes out to develop, or color, the image.

On the downstream of the paired pressure developing rollers 68 is extended the path 121 to the top of the apparatus housing 100 along inside the apparatus housing 100. The alternative path 121 has a plurality of paired feed rollers (two pairs in the embodiment, 122 and 123) provided in a course thereof. The medium 3 having the development process made by the paired pressure developing rollers 68 is stabilized in the colorization while being fed on the alternative path 121 by the paired feed rollers 122 and 123.

In other words, the colorization needs some time (wait time) until the ink exudation stabilizes even after release of the pressure by the paired pressure developing rollers 68. To secure the wait time, it is preferable that length of the alternative path 121 should be made longer. It should be noticed that the alternative path 121 can be set to a desired length according to the switchback distance of the switchback section 64. This allows the wait time to be set depending on the kind of ink used.

On the upstream of the paired feed rollers 122 is disposed a media detecting sensor 125. If a downstream edge of the medium 3 fed on the alternative path 121 passes the media detecting sensor 125, a signal output of the media detecting sensor 125 synchronizes a cutting device 72 to run, which will be described later.

A high-speed feed path 124 is provided in connection with an end of the alternative path 121 and extended through a top right side of the apparatus housing 100 to an outlet placed on a top left side of the apparatus housing 100.

For the high-speed feed path 124 are provided paired high-speed feed rollers 126 and the cutting device 72. The paired high-speed feed rollers 126 are controlled to rotate at the same rate as or a little faster than the feed rollers provided in the apparatus housing 100 except for the paired pressure developing rollers 68 at least. The cutting device 72 is arranged on the top of the apparatus housing 100 (top right side looking on the drawing) and serves to cut four margins of the medium 3.

Figure 3:
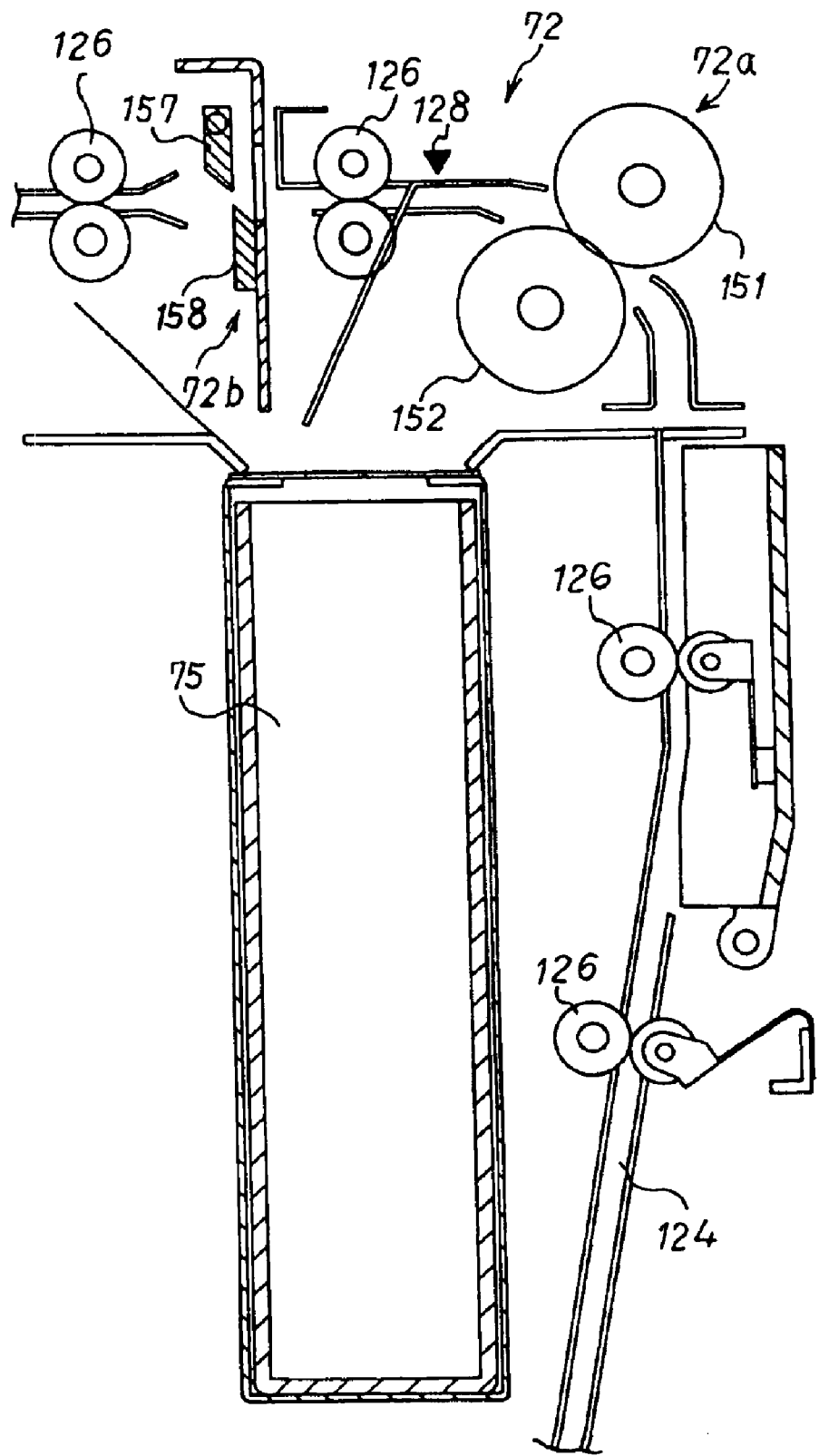
FIG. 3 is an enlarged side view for a structure of peripheries around a cutting device.
Figure 4:
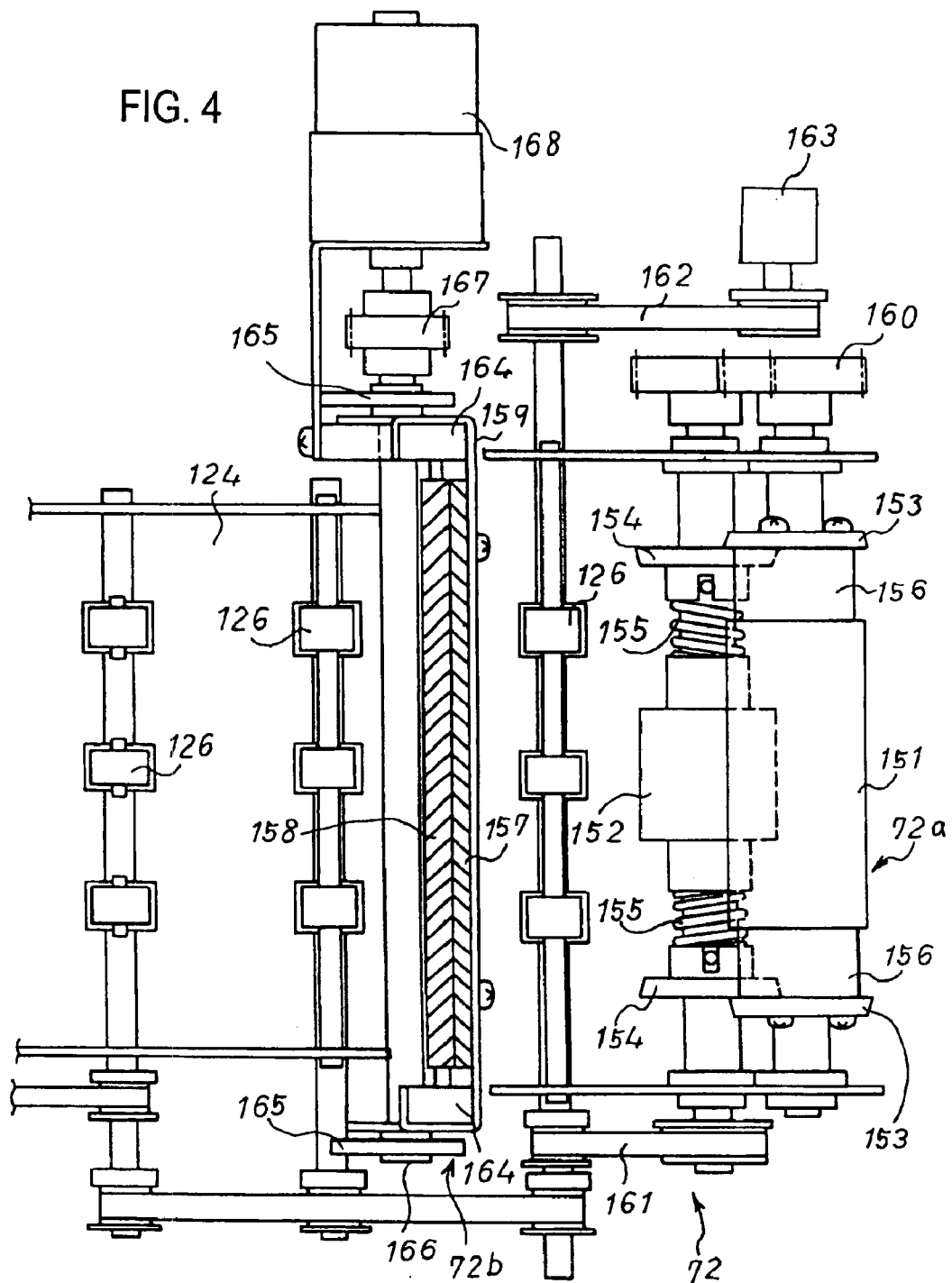
FIG. 4 is an enlarged top view for a structure of peripheries around a cutting device.
Figure 5:
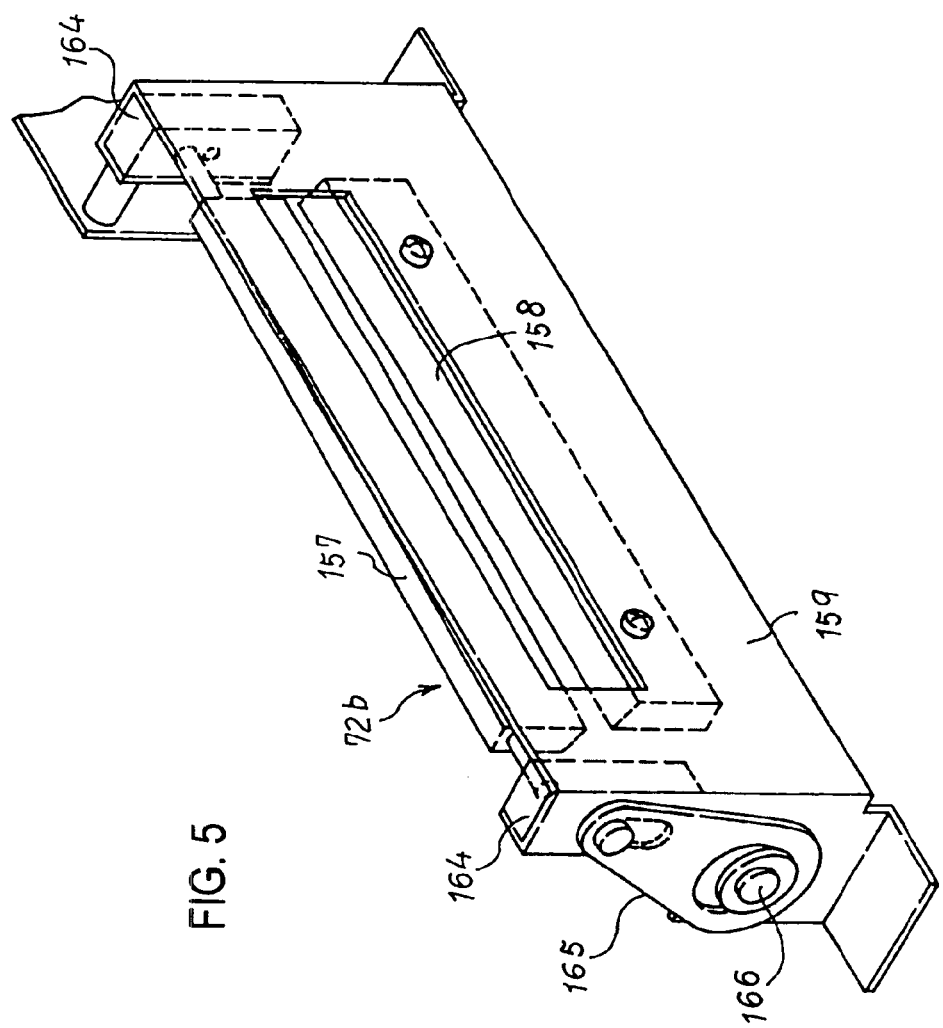
FIG. 5 is a perspective view for a structure of an end cutter in the cutting device.

The cutting device 72, as shown in FIGS. 3 through 5, has a side cutter 72a formed in a longer direction of the high-speed feed path 124, or the feed direction of the medium 3, for cutting the both side edges of the medium 3 while the medium 3 is fed, and an end cutter 72b formed along the feed path, in a direction traversing the high-speed feed path 124, for cutting the leading and trailing end edges of the medium 3 while the medium 3 is stopped. The side cutter 72a cuts first halves of the both side edges of the medium 3 in the feed direction before cutting the last halves of the both side edges in a specific timing. In the embodiment is arranged the side cutter 72a on the upstream side of the high-speed feed path 124 and at a curve of the high-speed feed path 124 on the top corner of the apparatus housing 100 and is arranged the cutter 72b on the virtually horizontal path on the downstream side thereof. Alternatively, the edge cutter 72b may be arranged on the upstream of the high-speed feed path 124, and the side cutter 72a may be arranged on the downstream side thereof.

The side cutter 72a has paired rollers (first and second rollers 151 and 152) rotating while press-contacting with each other for guiding the medium 3 along the high-speed feed path 124 and has rotary blades (first and second rotary blades 153 and 154) disposed on each end of the first and second rollers 151 and 152 respectively for cutting both side edges of the medium 3 as rotated by the first and second rollers 151 and 152. That is, the medium 3 is cut of the both side edges while being fed to change in a direction along a part of surface of the second roller 152 arranged downward as nipped by the first and second rollers 151 and 152. The high-speed feed path 124 in the embodiment has a curvature of around 90 degrees on a curved portion thereof on which the side cutter 72a is arranged as the high-speed feed path 124 on the top corner of the apparatus housing 100.

The first and second rotary blades 153 and 154 are rotated while always press-contacting with each other while the first and second rollers 151 and 152 are rotated. Each of the first rotary blades 153 disposed for the respective ends of the first roller 151 is fixed on the first roller 151 via a spacer 156 extendedly provided in the direction traversing the high-speed feed path 124. Each of the second rotary blades 154 disposed for the respective ends of the second roller 152 is always pressed outward (toward the first rotary blade 153 by an urging spring 155 arranged between the second rotary blade 154 and the second roller 152. With such a structure, the second rotary blade 154 is always kept pressed to the first rotary blade 153 by urging force of the urging spring 155. The extension of the spacer 156 can be adjusted to change the both side edge widths cut out of the medium 3.

The end cutter 72b has paired blades (upper blade 157 and lower blade 158) of capable of cutting the both leading and trailing edges of the medium 3 by moving in a direction traversing the medium 3 and up and down vertically in relation to the medium 3. As an example of the embodiment, it is structured that the lower blade 158 is fixed on a frame supported on the apparatus housing 100, and the upper blade 157 is provided to move up and down along the lower blade 158. The present invention, however, should not be limited to the structure but instead, paired blades fixed on a sliding member moving in the direction traversing the medium 3, as an example, can be used.

The cutting device 72 also has a driving arrangement for driving the cutting device 72 and can be controlled in its own timing. The driving arrangement is divided into a side cutter driving arrangement and an edge cutter driving arrangement that can be controlled in their respective own timings.

In the side cutter driving arrangement, the first roller 151 is linked via a gear arrangement 160 with the second roller 152, the second roller 152 is linked via an endless belt 161 with the paired high-speed feed rollers 126 (rollers arranged between the side cutter 72a and the end cutter 72b in the embodiment), and the paired high-speed feed rollers 126 are linked via an endless belt 162 with a side cutter driving motor 163.

In the edge cutter driving arrangement, the upper blade 157 is linked on both ends thereof with cams 165 via vertically sliding member 164, and the cams 165 are rotatably supported by an eccentric cam shaft 166. The eccentric cam shaft 166 is liked via a gear arrangement 167 with an edge cutter driving motor 168.

Controlling the driving arrangements in their own timings makes it possible to adjust time for a bleaching process which will be described later, resulting in increased efficiency and stabilization of the printing process.

The cutting device 72 described above is structured to eliminate curling of the medium 3 for plain surface to cut the edges. As an example, the medium 3 could be curved in the direction traversing or in a longer direction along the feed path when passing the processing sections provided on the upstream, particularly the paired pressure developing rollers 68 as the developing section.

As means for eliminating, or correcting, the curve, the side cutter 72a has both the first and second rollers 151 and 152 served to eliminate the curve of the medium 3 warping in the directing traversing the feed path when the first and second rotary blades 153 and 154 cut the both side edges of the medium 3. That is, the both side edges are cut while the first and second rollers 151 and 152 stretch the width direction curve (curling) of the medium 3. On the curve of the high-speed feed path 124, or on the top corner of the apparatus housing 100, as described above, is arranged the side cutter 72a and the first and second roller 151 and 152. The medium 3 could be curved in the direction traversing the feed path in the course curved along the part of the surface of the one pressure developing roller by being pressed at a high pressure when passing the paired pressure developing rollers 68 as the developing section. To eliminate, or correct, the curve, the medium 3 held by the first and second rollers 151 and 152 are positioned to a curving posture opposite to the curve produced in the medium 3 in the developing section. For the purpose, the feed path from the developing section (the paired pressure developing rollers 68) to the cutting device 72 is virtually S-shaped, thereby eliminating, or correcting, the curve produced in the medium 3.

The cutting device 72 has a decurling arrangement (not shown) for eliminating the curve of the medium 3 in the longer direction of the feed path before the blades 157 and 158 of the end cutter 72b cut the leading and trailing end edges of the medium 3. The decurling arrangement can be formed of paired rollers of relatively large diameter. With such a structure, the leading and trailing end edges can be cut out while the curve (curling) in the longer direction is stretched by the decurling arrangement.

In the cutting device 72, a path length in the longer direction of the feed pa3th from the side cutter 72a to the end cutter 72b is determined shorter than a length of the medium 3 in the longer direction. It is further preferable that the path length in the longer direction of the feed path from the side cutter 72a to the end cutter 72b is determined to a half of the length of the medium 3 in the longer direction. With the path length determined as such, the cutting device 72 can be made compact, resulting in making the printer 1 smaller.

Further, to lead the medium 3 into the side cutter 72a and the end cutter 72b of the cutting device 72 stably and securely, it is preferable that a leading member, for example, a taper or mylar, should be arranged on the feed path right before leading the side cutter 72a and the end cutter 72b each.

The medium 3 in the cutting device 72 is cut on the first halves of the both side edges by the side cutter 72a first, on the leading end edge by the end cutter 72b, on last halves of the both side edges by the side cutter 72a, and on the trailing end edge by the end cutter 72b in the order. For the operation, a media detecting sensor 128 is arranged in front of the upstream side of the end cutter 72b for always detecting the leading and trailing positions on the upstream and downstream sides of the medium 3 being fed, thereby controlling the end cutter 72b for cutting timings of the leading and trailing end edges of the medium 3. It should be noticed that rotational rates of the first and second rollers 151 and 152 of the paired side cutters 72a are controlled to rotate at the same rate as the paired high-speed feed rollers 126.

The paired rollers 109, 110, and 111 arranged in the media cassette 55 formed as parts of the exposing section, the paired feed rollers 112, 114, 117, and 118 arranged on the feed path for the medium 3 from the media cassette 55 to the paired pressure developing rollers 68 as the developing section, and the paired feed rollers 122, 123, and 126 (paired high-speed feed rollers arranged between the paired feed rollers 123 and the side cutter 72a) arranged on the feed path between the paired pressure developing rollers 68 and the cutting device 72, are all made to surface-contact the both side edges of the medium 3 to feed to the downstream side. The surface-contacting areas of the medium 3 are cut out later by the side cutter 72a of the cutting device 72. Even if the areas are scratched, therefore, the medium 3 is not deteriorated in image quality, being able to keep the print at a desired status.

Below the cutting device 72 (higher portion of the apparatus housing 100) is arranged a containing section 75 for containing the margins cut out of the medium 3 therein, or the margin dust cut out by the cutting device 72 dropped into the containing section 75 to collect. In the embodiment, the both side edges cut out of the medium 3 by the side cutter 72a of the cutting device 72 drop arcing along parts of the surface of the second roller 152 down into a containing section 75. The leading and trailing end edges cut out of the medium 3 by the end cutter 72b drop vertically down into the containing section 75. In actual operation, the environment in the apparatus tends to generate static electricity as the atmosphere is at high temperature and the cut material is of polyester. The static electricity causes sticking of the cut margins when the margins of the medium 3 are cut by the paired slitter rollers 72a (side cutter) and the cutter 72b, resulting in difficulties in dropping of the various margins and sticking on the inlet. For the reason, the containing section 75 in the embodiment has a specific antistatic process made thereon. Examples of the antistatic process may include sticking of a conductive material such as copper tape to parts of the containing section 75 or forming the entire containing section 75 of a conductive material such as a metallic material.

The high-speed feed path 124 on the downstream end of the cutting device 72 has a bleaching section 77 for bleaching process.

The following describes the bleaching process briefly.

The medium 3 exposed on the exposing stage 55 forms an image as it exudates necessary amount of die (ink) as being pressed. To express variable densities, the medium 3 is exposed to intermediate amounts of light to make hardness of the microcapsules intermediate, thereby making the ink exudation intermediate. If the medium 3 is left in such a condition after pressing, the ink exudation proceeds. The medium 3 therefore cannot be fixed to a desired color. To prevent that, light is re-irradiated on the printing surface 3a of the medium 3 in the course of feeding from the cutting device 72 to a post-heating section 80 (outlet, which will be described later). Such a process can completely cure the microcapsules that have not been fully cured yet. The printing surface 3a thus can keep stable print image for years without color change.

The embodiment has the bleaching section 77 arrange with use of the space above the exposing projector 60. In view of the fact that considerable amount of the light emitted from the light source 60a of the exposing projector 60 (FIG. 2) is leaked out, the bleaching section 77 is arranged at a position where the leaked light can be used, that is, a position above the exposing projector 60.

It should be noticed that the printing surface 3a of the medium 3 is directed upward in the bleaching section 77, or in a direction opposite to the light source 60a, as the medium 3 is reverted in the switchback section 64. For the reason, to irradiate the leaked light down to the printing surface 3a, a mirror (not shown) is arranged above the exposing projector 60. It is preferable to set the paired feed rollers arranged in the bleaching section 77 to be driven a little slower than the ones arranged in the other feed paths in view of fast continuous process of the medium 3, as the bleaching exposure has to be made for a specific time for a desired effect.

On the downstream end of the bleaching section 77, or at the top left side of the apparatus housing 100, is disposed the outlet in which the post-heating section 80 is arranged.

The post heating is to make a heating process for accelerating the coloring process as the coloring takes long time until the die (ink) develops its primary color. The post heat is made at 90° C. for one minute to virtually saturate exudation of the die, thereby preventing color change afterwards.

Making the medium 3 stay on the feed path is limited in connection with the medium 3 for continuous printing process to form the image on the medium 3 and lowers the production capability as will be described later. For the reason, the post-heating section 80 in the embodiment is formed of a room for continuously stacking the media 3 vertically at a specific position and a temperature control arrangement, including a sensor and a heater, for keeping the room at a specific temperature. The room temperature is controlled to the desired one of 90° C. mentioned above.

The bleached medium 3 in the post-heating section 80 is led to paired retention guides (not shown) facing each other before positioning it on leads (not shown) of lead screws 131. The lead screws 131 are at positions at which four corners of the medium 3 can be stably supported. In the state, the paired retention guides are saved away once before the lead screws 131 are rotated one turn to move the medium 3 down by one lead. The paired retention guides 83 then are returned to the media bringing position to position the following medium 3 at the leads of the lead screws 131.

Such repeated operations, including bringing the medium 3, positioning, and moving down, make the medium 3 stay in the post-heating section 80. For the duration, the medium 3 is heated by a heater (not shown) to fully develop the colors and prevent aging.

The lead screws 131 are further turned to make the medium 3 discharge onto a discharge tray (not shown) via a feed belt (not shown) in ascending order.

Corners 146 and 147 on the feed path of the printer 1 constructed as described above are formed to curve at a curvature corresponding to a shape and dimensions of the apparatus housing 100. The corners 146 and 147 have one or a plurality of urging rollers provided for urging the medium 3. The embodiment has one urging roller 148 disposed inside the corner 146 and has two urging rollers 149 and 150 disposed inside the corner 147. The urging rollers 148, 149, and 150 are structured to urge the medium 3 outward from the printing surface 3a side when the medium 3 passes the corners 146 and 147. If the printing surface 3a is urged directly on the printing area thereof, the printing surface 3a is injured. To avoid this, the urging rollers 148, 149, and 150 in the embodiment are arranged to urge (press) edges surrounding the printing area of the printing surface 3a at specific urging forces. It should be noticed that the urging force can be optimized depending on the type of medium 3, the feed speed, and the curvatures of the corners. Such a structure has the advantage that the medium 3 can pass the corners 146 and 147 stably without deviation in the feed direction while the printing surface 3a is protected. The edges of the medium 3 have no problem for scarring due to the urging rollers since they are cut out by the cutting device 72.

The following describes operation of the Cycolor printer configured as described above briefly.

When printing is started in the state that the media cassette 5 is loaded in the cassette room 2, the media 3 fed from the media cassette 5 by pick roller 101 are fed out one by one to the feed path 51 by the media separating arrangement, including the feed roller 102 and the separating roller 103, before being fed from the pre-stage path 52 to the exposing stage 55. At the exposing stage 55, the medium 3 stops once. The exposing projector 60 irradiates light onto the printing surface 3a of the medium 3 on the basis of a desired image pattern, thereby making the exposure process as a preprocess for forming the desired image.

After the exposure process ends, the exposed medium 3 is transferred to the post-stage path 57 with the printing surface 3a directed up and specifically cleaned by the paired cleaning rollers 115 before being fed through the feed path 62 to the switchback section 64.

The switchback section 64 allows the exposed medium 3 to stay for a time (dark time) enough to fully develop its colors. It should be noticed that the successive media 3 fed after are made to stay on the feed paths 57 and 62 between the exposing stage 55 and the switchback section 64. After that, the preceding medium 3 is fed back on the feed path 62 again at a specific timing as the paired feed rollers 117 and 118 are controlled to rotate inversely.

The medium 3 fed back on the feed path 62 is fed to the alternative path 121 via the switching gate 120, is guided to the paired pressure developing rollers 68, and has surface load applied to the both sides thereof, thereby forming (color-developing) the desired image.

The medium 3 having the development process completed is continued to feed along parts of the surface on one of the paired pressure developing rollers 68 to transfer from the alternative path 121 to the high-speed feed path 124, is checked for paper jamming in the course of feed by the paper jam detecting sensor 127, and is fed to the cutting device 72.

The medium 3 having the four side edges cut out by the cutting device 72 is bleaching-processed (ink-fixing-processed) during passing the bleaching section 77, is discharged to the take-out part (post-heating section 80) on the top left side of the apparatus housing 100. It should be noticed that the media detecting sensor 129 arranged in front of the upstream side of the post-heating section 80 controls the discharge timing for the medium 3.

The cutting device 72 in the embodiment, as described above, is structured to cut the four edges out of the medium 3 being fed by having a side cutter 72a for cutting both side edges of the medium 3 fed in the feed direction of the medium 3, having the end cutter 72b for cutting the leading and trailing end edges out of the medium 3 fed in the feed direction of the medium 3, and having the feed path 124 with the curves formed on at least one part thereof where the side cutter is arranged on the corner of the feed path 124. The cutting device 72 therefore can cut the four edges out of the medium 3 accurately and securely while making the medium 3 elastic on the corner of the high-speed feed path 124.

Also, the cutting device 72 can be made compact since the path length in the longer direction of the feed path from the side cutter 72a to the end cutter 72b is determined shorter than, preferably the half of, the length of the medium 3 in the longer direction.

Further, the cutting method provides accurate and secure cutting of the four edges out of the medium 3 and shortening of the time taken by the cutting as well since the cutting method has the steps of cutting the leading end edge or the step of cutting the trailing end edge put between the step of cutting the both side edge first half areas out of the medium 3 and the step of cutting the both side edge last half areas out of the medium 3.

Further more, with the printer 1 in the embodiment, the paired rollers 109, 110, and 111 arranged in the exposing stage 55 formed as parts of the exposing section, the paired feed rollers 112, 114, 117, and 118 arranged on the feed path for the medium 3 from the exposing stage 55 to the paired pressure developing rollers 68 as the developing section, and the paired feed rollers 122, 123, and 126 (paired high-speed feed rollers arranged between the paired rollers 123 and the side cutter 72a) arranged on the feed path between the paired pressure developing rollers 68 and the cutting device 72, are all made to surface-contact the both side edges of the media 3 to feed to the downstream sides. The surface-contacting areas of the medium 3 are cut out later by the side cutter 72a of the cutting device 72. Even if the areas are scratched, therefore, the medium 3 is not deteriorated in image quality, being able to keep the print at a desired status. The medium 3 used in such a printer 1 as described above can decrease the running cost since it, unlike the prior art, does not need the technique that the four edges of the medium 3 are pre-exposed to white in advance and, the microcapsules existing on the edges are made inactive as the white frame to prevent the white edges from becoming black even if after that, the pressure is applied to the edges at the cutting step for the standard form (creating cut sheets).

Further, with the printer 1 in the embodiment, controlling the driving arrangements for driving the cutting device 72 in their own timings makes it possible to adjust time for a bleaching process which will be described later, resulting in increased efficiency and stabilization of the printing process.

Further more, with the printer 1 in the embodiment, the cutting device 72 is structured to eliminate curling of the medium 3 for plain surface to cut the edges, thereby making it possible to always cut the edges out of the medium 3 at accurate size.

More over, with the printer 1 in the embodiment, the dust of edges cut out by the cutting device 72 will not stick to the inlet of the containing section 75 but drops smoothly into the inside since the containing section 75 for collecting dust of the edges cut out by the cutting device 72 is antistatic-processed.

The present invention is not limited to the embodiment described above, but can be modified in many ways as follows.

The cutting device 72 in the above-described embodiment has the side cutter 72a and the end cutter 72b arranged in this order from the upstream to the downstream on the feed path. On the contrary, the end cutter 72b and the side cutter 72a can be arranged in this order from the upstream to the downstream on the feed path. With the cutting device structured above, the end cutter 72b cuts the leading end edge margin and the trailing end edge margin out of the medium 3 before the side cutter 72a cuts the both side margins out of the medium 3 from the first half area to the last half area. In that case, the same operational effect as the embodiment described above can be obtained with the structure that the path length in the longer direction of the feed path from the side cutter 72a to the end cutter 72b is determined shorter than, preferably the half of, the length of the medium 3 in the longer direction.

In the cutting device 72 (end cutter 72b) in the embodiment described above, it is structured that the lower blade 158 is fixed on the frame 159 supported on the apparatus housing 100, and the upper blade 157 is provided to move up and down along the lower blade 158. The same operational effect can be obtained with a contrary structure that the upper blade 157 is fixed on the frame 159 supported on the apparatus housing 100, and the lower blade 158 is provided to move up and down along the upper blade 157.

The embodiment of the present invention has been described in detail with the example of Cycolor type printer suitable for the Cycolor film as a photosensitive recording sheet. The present invention can also be embodied for printers of other different types.

What is claimed is:

1. A printer for a recording medium comprising:
an exposing section for exposing the recording medium,
first feed means arranged in the exposing section for feeding the recording medium while contacting two side edges of the recording medium in a feed direction of the recording medium,
a developing section for pressing the recording medium exposed at the exposing section for development,
a recording medium feed path arranged between the exposing section and the developing section for feeding the recording medium,
second feed means arranged in the recording medium feed path for feeding the recording medium exposed at the exposing section to the developing section while contacting the two side edges of the recording medium,
a cutting device for cutting four edges of the recording medium including the two side edges,
third feed means arranged between the developing section and the cutting device for feeding the recording medium developed at the developing section to the cutting device while contacting the two side edges of the recording medium,
a containing section arranged below the cutting device for containing the four edges of the recording medium cut by the cutting device so that the two side edges of the recording medium drop in the containing section in a curved path, and leading and trailing end edges of the recording medium drop in the containing section vertically, and an apparatus housing for retaining at least the exposing section, the developing section, the cutting device, and the first, second, and third feed means therein.

2. A printer according to claim 1, wherein a path including said recording medium feed path from the exposing section to the cutting device includes at least one curved portion, said cutting device being arranged at the at leaste one curved portion.

3. A printer according to claim 1, wherein said cutting device is arranged at an upper corner of the apparatus housing.

4. A printer according to claim 2, wherein said developing section incudes a curved feed path for guiding the recording medium to the cutting device, said curved feed path being connected to the curved portion of the recording medium feed path so that the recording medium feed path being formed in a S-shape.

5. A printer according to claim 1, wherein said cutting device includes vertical cutting means having a blade capable of moving vertically relative to the recording medium for cutting the leading and trailing edges of the recording medium in the feed direction, and rotary cutting means having a rotary blade for cutting the two side edges of the recording medium in the feed direction while rotating and pressing.

6. A printer according to claim 5, further comprising a feed roller provided coaxially with a rotating shaft of the rotary cutting means, said developing section having a pressure roller for feeding the recording medium while pressing so that the recording medium is fed along parts of surfaces of the feed roller and the pressure roller.

7. A printer according to claim 6, wherein said containing section includes means processed with an antistatic process.

8. A printer according to claim 7, wherein said containing section includes a portion formed of a conductive material processed with the antistatic process.

9. A printer for a recording medium comprising:

an exposing section for exposing the recording medium, first feed means arranged in the exposing section for feeding the recording medium while contacting two side edges of the recording medium in a feed direction of the recording medium, a developing section for pressing the recording medium exposed at the exposing section for development, said developing section having a pressure roller for feeding the recording medium while pressing, a recording medium feed path arranged between the exposing section and the developing section for feeding the recording medium, second feed means arranged in the recording medium feed path for feeding the recording medium exposed at the exposing section to the developing section while contacting the two side edges of the recording medium, a cutting device for cutting four edges of the recording medium including the two side edges, said cutting device including vertical cutting means having a blade capable of moving vertically relative to the recording medium for cutting leading and trailing edges of the recording medium in the feed direction, and rotary cutting means having a rotary blade for cutting the two side edges of the recording medium in the feed direction while rotating and pressing, third feed means arranged between the developing section and the cutting device for feeding the recording medium developed at the developing section to the cutting device while contacting the two side edges of the recording medium, a feed roller provided coaxially with a rotating shaft of the rotary cutting means so that the recording medium is fed along parts of surfaces of the feed roller and the pressure roller, a containing section arranged below the cutting device for containing the four edges of the recording medium cut by the cutting device so that the two side edges of the recording medium cut by the rotary cutting means drop in the containing section in a curved path along parts of the surface of the feed roller, and the leading and trailing end edges of the recording medium cut by the vertically cutting means drop in the containing section vertically, and an apparatus housing for retaining at least the exposing section, the developing section, the cutting device, and the first, second, and third feed means therein.

* * * * *